July 29, 1924.
R. V. NORRIS
OIL RESERVOIR FOR MOTORS
Filed Jan. 10, 1923
1,503,334
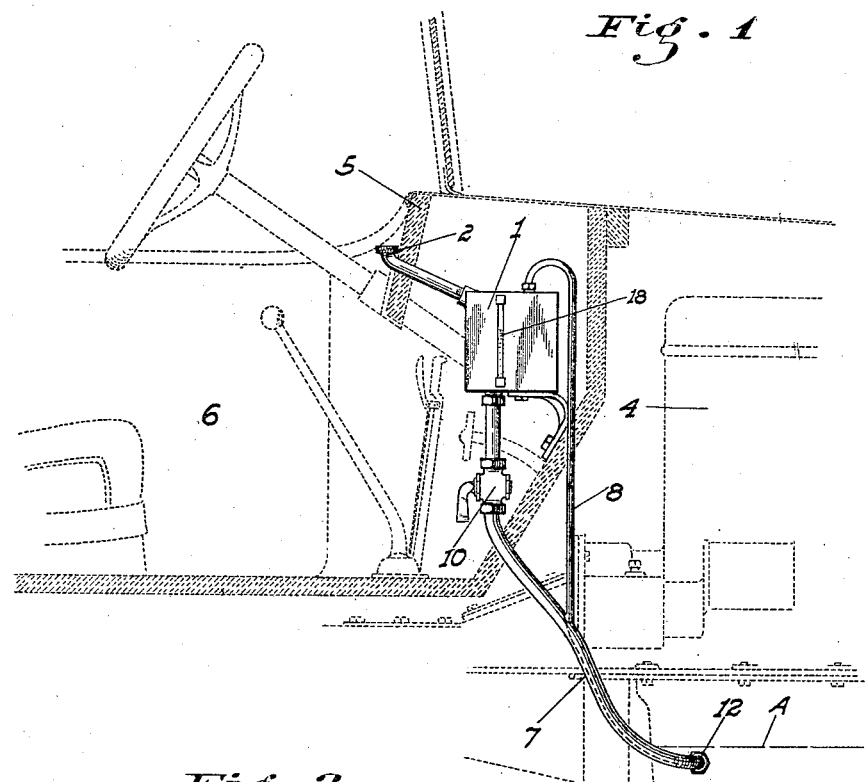
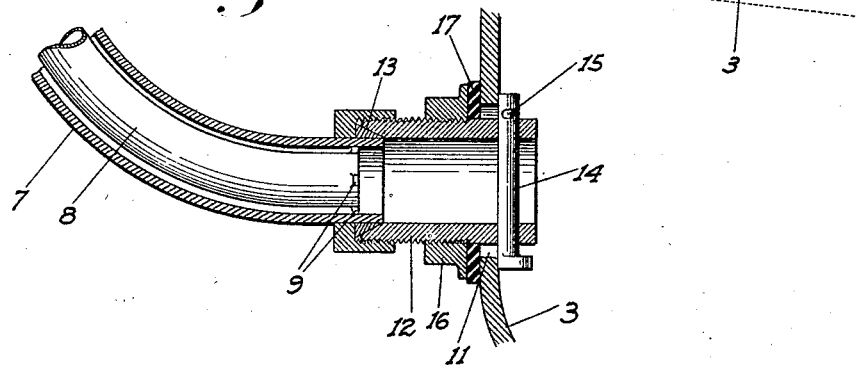
INVENTOR.
Rolla V. Norris
BY
ATTORNEY Patented July 29, 1924.

1,503,334

UNITED STATES PATENT OFFICE.

ROLLA V. NORRIS, OF PORTERVILLE, CALIFORNIA.

OIL RESERVOIR FOR MOTORS.

Application filed January 10, 1923. Serial No. 611,826.

*To all whom it may concern:*

Be it known that I, ROLLA V. NORRIS, a citizen of the United States, residing at Porterville, county of Tulare, State of California, have invented certain new and useful Improvements in Oil Reservoirs for Motors; and I do declare the following to be a full, clear, and exact description of the same, reference being had to the accompanying drawings, and to the characters of reference marked thereon, which form a part of this application.

This invention relates to improvements in accessories for internal combustion engines, and particularly to those whose main oil supply is carried in the crank case or pan, such as those of motor vehicles generally, which classification is intended to include tractors.

The principal object of my invention is to provide a reserve oil reservoir, and means connecting this reservoir with the crank case of the engine in such a manner that as the original oil supply in the latter is depleted, either through legitimate burning up or by reason of leakage, said supply will be automatically maintained at a normal level without any attention on the part of the driver being necessary other than to see that the reserve reservoir does not become empty. At the same time, no matter how much oil there may be in the reserve tank, the flow into the crank case will automatically cease as soon as the proper level of oil therein is restored, so that no waste of oil due to overflow or too great a splash on the cylinder walls will be had.

Very few if any cars are provided with an oil gauge, on the dash, so that the driver can tell at an instant how much oil is in his crank case. Some cars have quantity or depth gauges, but they are under the hood, usually covered with grease and dirt, and in any event cannot be looked at while driving along the road.

It may then be accepted as a general rule that but few drivers can tell, when asked off-hand, whether their oil supply is up to normal or not, unless they have just filled up, and as a result, exhaustion of the oil supply when on the road, with the consequent burning out of bearings or other troubles, is a common occurrence.

With my improved device a driver will know positively that if (and he can tell this by a glance) he has any oil at all in the reverse tank, his crank case is entirely full, and not merely half or quarter full.

With this device installed on a car, therefore a driver may proceed on a trip with confidence that his oil conditions are satisfactory without any under-the-hood inspection on his part being necessary.

Further, the supply may be replenished under cover and without the driver having to leave his seat—a convenience to him, especially in inclement weather.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a side outline of the driving compartment of an automobile, with a portion of the engine, showing my device as installed.

Fig. 2 is an enlarged section of a form of pipe connection preferably used at the crank-pan.

Referring now more particularly to the characters of reference on the drawings, the numeral 1 denotes an airtight tank of suitable capacity, provided with a filling hole and cap 2, and permanently mounted at a higher level than that of the oil level in the pan 3 of the engine 4, preferably behind the dash 5 of the car in the driver's compartment 6.

If the device is mounted on a tractor, a similar location would be chosen.

Projecting down from the bottom of the tank 1 to the pan 3 and making connection with the latter at a point a little distance below the full oil level line A is a pipe 7 while an air pipe 8 projects upwardly from the top of the tank 1 for a certain distance and thence downwardly and into the pipe 7, a certain distance from the tank, extending thence to the inner end of said pipe 7 in spaced relation thereto, the junction of said pipes being made air tight.

The inner end of the pipe 8 may be held from movement in the pipe 7 by ears 9 bent outwardly from the edge of pipe 8 and bearing against the inner wall of pipe 7.

A shut-off valve 10 is interposed in the pipe 7 ahead of the pipe 8, so that a flow of oil therethrough may be cut off at will, as for instance when the oil in the pan 3 is to be cleaned out.

Owing to the fact that the average crank pan is too thin to stand tapping, I preferably employ the following means of making the connection of the pipe 7 therewith; a hole 11 is drilled in the pan 3 to freely receive a nipple 12, the pipe 7 being connected to said nipple after the latter is placed by means of the solderless form of connection commonly used, as shown at 13.

Slidably passed through the nipple adjacent its inner end is a headed pin 14, having a cross-pin 15 on its end opposite the head so spaced as to allow the head to move away from the nipple to a certain extent.

In installing this part, the nipple is turned so that the head on pin 14 rests against the nipple, and the latter is then tilted so that the pin will pass through the hole 11 and into the pan. The nipple is then turned to cause the head of the pin to drop from the nipple, thus locating said head outwardly of the hole 11. The nipple is then clamped in place by means of a nut 16 on the outside of the pan, with an oil tight gasket 17 between the nut and pan.

Remembering that the entire device is air tight except at the inner or lower ends of the pipes 7 and 8, it will be evident that if the nipple 12 is covered by oil in the pan 3, the lower end of the pipe 8 will likewise be sealed, thus preventing any air from entering the tank 1 and preventing of course any oil from leaving the same through the pipe 7.

If the oil drops below the nipple 12, or uncovers pipe 8 to a certain extent, the air always in the crank case is free to pass up said pipe, allowing oil to flow through pipe 7 into the pan 3, restoring normal conditions, which results in the flow of oil being shut off.

Of course in reality the action does not take place in this spasmodic manner, but maintains a practically constant level of oil at all times without any appreciable rise and fall.

A glass-gauge 18 is preferably mounted on the tank 1 so that the amount of oil therein may be seen at a glance at any time.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention, what I claim as new and useful and desire to secure by Letters Patent is:

1. In an auxiliary oil supply device for oil reservoirs an oil pipe, an air pipe, extending inside the same for a certain distance and terminating adjacent the lower end thereof, a sleeve member to the outer end of which the oil pipe is connected, said sleeve being adapted to pass through an orifice in the wall of the reservoir, means permanently mounted with the sleeve for engaging the inner face of said wall, and means whereby the sleeve is placed in position from the outside of the reservoir.

2. In an auxiliary oil supply device for oil reservoirs, an oil pipe, an air pipe extending inside the same, and terminating adjacent the lower end thereof, a sleeve member to the outer end of which the oil pipe is attached, a pin extending transversely through the sleeve adjacent its inner end, said pin being arranged to be inserted diagonally through an enlarged orifice in the wall of the reservoir, and to then bear against the inner face thereof on both sides of the sleeve, and a nut screwed on the sleeve outside the wall and adapted to be moved into frictional engagement therewith and to then close the wall orifice.

3. In an auxiliary oil supply device for oil reservoirs an oil pipe, an air pipe, extending inside the same for a certain distance and terminating adjacent the lower end thereof, a sleeve member to the outer end of which the oil pipe is connected, said sleeve being adapted to pass through an orifice in the wall of the reservoir, means permanently mounted with the sleeve for engaging diametrally opposed points of the inner face of the wall adjacent the orifice, and means manipulated from the exterior of the reservoir for closing the orifice about the pipe.

4. In an auxiliary oil supply device for oil reservoirs an oil pipe, an air pipe, extending inside the same for a certain distance and terminating adjacent the lower end thereof, a sleeve member to the outer end of which the oil pipe is connected, said sleeve being adapted to pass through an orifice in the wall of the reservoir, means permanently mounted with the sleeve for engaging diametrally opposed points of the inner face of the wall adjacent the orifice, a nut threaded on the sleeve outside the reservoir and a gasket on the sleeve between the nut and wall and of larger diameter than the orifice therein.

In testimony whereof I affix my signature.

ROLLA V. NORRIS.